(12) United States Patent
Sugumar et al.

(10) Patent No.: US 11,675,715 B2
(45) Date of Patent: Jun. 13, 2023

(54) LOW PIN-COUNT ARCHITECTURE WITH PRIORITIZED MESSAGE ARBITRATION AND DELIVERY

(71) Applicant: Intel Corporation, Santa Clara, CA (US)

(72) Inventors: Suresh Sugumar, Singapore (SG); Vishwanath Somayaji, Bangalore (IN); Sudeep Divakaran, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 923 days.

(21) Appl. No.: 16/366,789

(22) Filed: Mar. 27, 2019

(65) Prior Publication Data

US 2019/0236037 A1   Aug. 1, 2019

(51) Int. Cl.
  *G06F 13/16* (2006.01)
  *G06F 1/26* (2006.01)
  *G06F 13/42* (2006.01)

(52) U.S. Cl.
  CPC .......... *G06F 13/1642* (2013.01); *G06F 1/266* (2013.01); *G06F 13/4282* (2013.01); *G06F 2213/0042* (2013.01)

(58) Field of Classification Search
  CPC .. G06F 13/1642; G06F 1/266; G06F 13/4282; G06F 2213/0042
  USPC ...................................... 710/15, 39, 52, 112
  See application file for complete search history.

(56) References Cited

U.S. PATENT DOCUMENTS

| | | | | |
|---|---|---|---|---|
| 6,768,738 | B1* | 7/2004 | Yazaki | H04Q 11/0478 370/392 |
| 10,853,182 | B1* | 12/2020 | Vig | G06F 16/23 |
| 2007/0073921 | A1* | 3/2007 | Vemula | G06F 13/28 710/22 |
| 2013/0066943 | A1* | 3/2013 | Canning | H04L 65/80 709/203 |
| 2013/0339714 | A1* | 12/2013 | Hormuth | G06F 9/4401 710/308 |
| 2014/0201301 | A1* | 7/2014 | Bradley | G06F 8/65 709/208 |
| 2016/0191420 | A1* | 6/2016 | Nagarajan | H04L 49/25 370/389 |

(Continued)

*Primary Examiner* — Idriss N Alrobaye
*Assistant Examiner* — Henry W Yu
(74) *Attorney, Agent, or Firm* — Compass IP Law PC

(57) ABSTRACT

Methods and apparatus for implementing a low-pin count architecture with priority message arbitration and delivery. The architecture includes a hardware-based message arbitration unit (MAU) including a plurality of priority queues, each having a respective priority level, implemented on a first component, such as a processor and/or System on a Chip (SoC). The first component is communicatively coupled to a second component via a low-pin count link such as an I2C bus. The MAU receives prioritized messages from clients and enqueues the messages in priority queues based on their priority levels. An arbiter selects messages to transmit over the low-pin count link from the priority queues. The MAU further may abort transmission of a message in favor of transmission of a higher-priority message to guarantee a transmit latency. Under one implementation, the components are a processor and a PMIC configured to communicate with a USB Type-C power source and meet timing requirements defined by a USB Power Delivery Specification.

24 Claims, 10 Drawing Sheets

(56) References Cited

U.S. PATENT DOCUMENTS

| | | | |
|---|---|---|---|
| 2016/0196231 A1* | 7/2016 | Quach | G06F 11/3433 |
| | | | 710/307 |
| 2017/0192921 A1* | 7/2017 | Wang | G06F 9/3004 |
| 2017/0315747 A1* | 11/2017 | Yang | G06F 3/0634 |
| 2017/0364114 A1* | 12/2017 | Sporck | H02J 7/0071 |
| 2018/0293101 A1* | 10/2018 | Park | G06F 9/5038 |
| 2019/0227971 A1* | 7/2019 | O'Shea | G06F 13/4282 |
| 2020/0004584 A1* | 1/2020 | Burroughs | G06F 9/4881 |

* cited by examiner

Data Read (3 bytes example) – PMIC Transmitter

LOW PIN-COUNT ARCHITECTURE WITH PRIORITIZED MESSAGE ARBITRATION AND DELIVERY

BACKGROUND INFORMATION

Power management is an important aspect of many types of computing devices, including laptops, notebooks, tablets, and mobile phones. To address various aspects of power management, Power Management Integrated Circuits (commonly referred to as Power Management ICs or PMICs) have been developed. PMICs may perform various functions, such as controlling the direction and control of electrical power. For example, many computing devices have multiple internal voltages (e.g., 5 V, 3.3 V, 1.8 V, etc.) and sources of external power (e.g., AC/DC power supply, battery, etc.), meaning that the power design of the device has multiple requirements for operation. PMICs may also perform various functions, such as battery management, voltage regulation, and charging functions.

Historically, PMICs were designed to be implemented in computing devices that support the I²C communication protocol. I²C, pronounced I-squared-C or I-two-C, employs a 2-pin serial bus interface and uses a communication protocol consisting of packet-switched messages with support for multiple master and multiple slave devices. Originally developed in 1982 by Phillips Semiconductor (now NXP Semiconductors), the I²C communication protocol has been available for use without license since 2006 and is widely used today for attaching lower-speed peripheral ICs to processors and microcontrollers. In addition to I²C, PMICs also support various other interfaces, such as SMBus (System Management Bus).

Recently, a new version of Universal Serial Bus (USB) was introduced called USB Type-C™ and how called USB-C™. (For convenience, the terminology USB-C without the trademark will be used herein to refer to USB Type-C™/USB-C™ interfaces and protocols.) USB-C uses a 24-pin interface that is rotationally symmetrical. The USB-C interface includes four power and four ground pins, two USB 2.0 differential pairs for high-speed USB data, four shielded differential pairs for Enhanced SuperSpeed data (two transmit and two receive pairs), two Sideband Use (SBU) pins, and two Configuration Channel (CC) pins. The USB-C interface and communication protocol has been standardized by the USB Implementers Forum (USB-IF).

In view of the new USB-C standard, some of today's PMICs support enhanced communication and functionalities, including support for USB-C interfaces and USB-C Power Control. Other functionalities may include standard power delivery, power sequencing, battery management, real-time clock (RTC), and support for several auxiliary functions such as haptic vibrator, LEDS, etc. These are typically managed and controlled by the Host Application Processor connected to PMIC.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
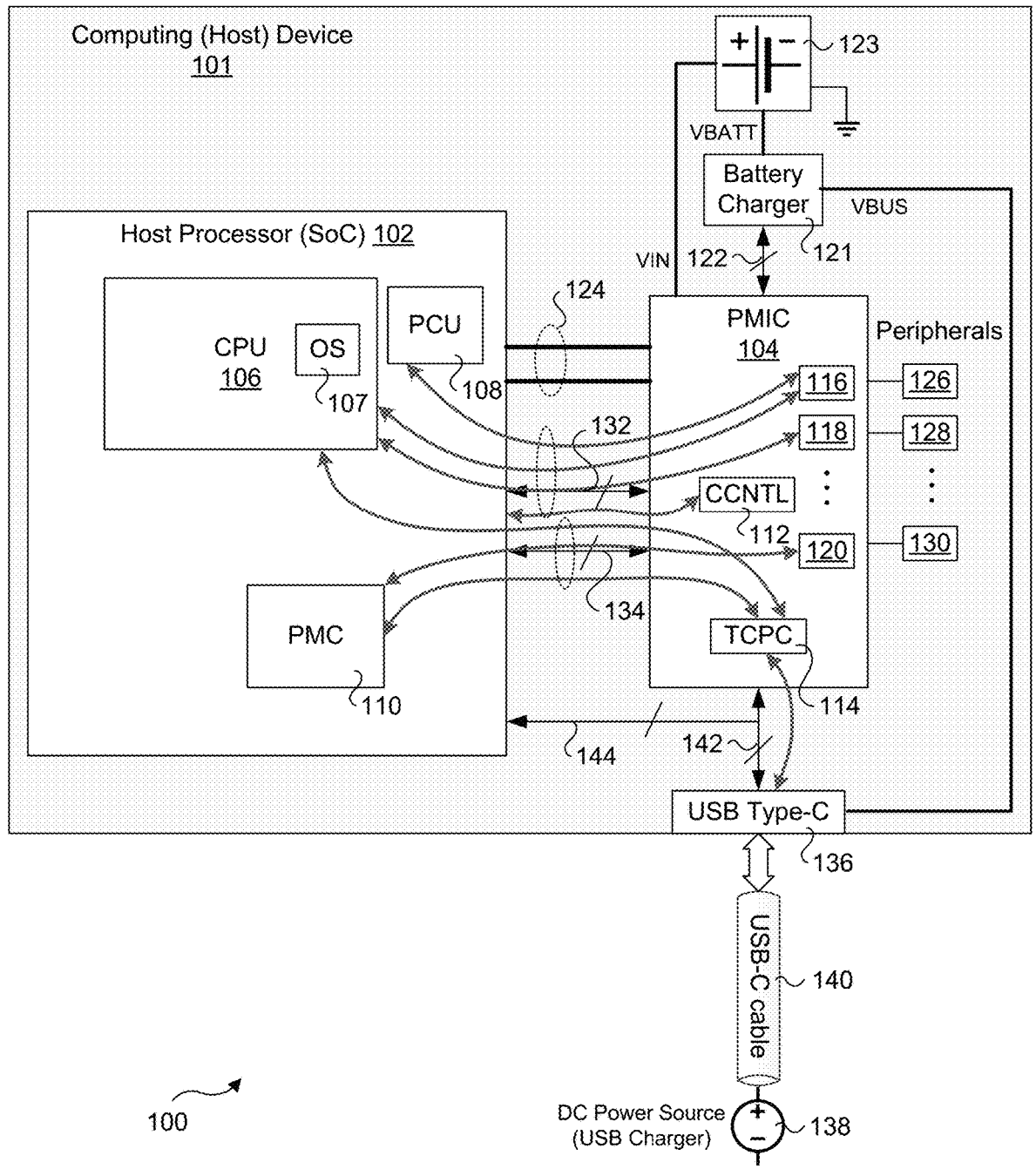
FIG. 1 is a schematic diagram illustrating an existing architecture under which communication between a host processor and a PMIC is facilitated through use of two communication links.

Embodiments of methods and apparatus for low pin-count architectures with prioritized message arbitration and delivery are described herein. In the following description, numerous specific details are set forth (such as implementation using an I²C bus) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Brief USB Power Delivery Overview

In USB Power Delivery (PD), pairs of directly Attached ports negotiate voltage, current and/or direction of power flow over the USB cable, using the USB Type-C connector's Configuration Channel (CC) wire as the communications channel. The mechanisms used, operate independently of other USB methods used to negotiate power. USB Power Delivery also acts as a side-band channel enabling communications with the cable assembly connecting the ports. Modes are associated with a Standard or Vendor ID (SVID). Power Delivery Structured VDM Messages can be used to discover supported SVIDs and Modes and then to enter and exit Modes as required. Multiple Active Modes can also be in operation at the same time.

While in Power Delivery Mode there will be a Contract in place (either Explicit or Implicit) determining the power level available and the direction of that power. The Port Pair remains in Power Delivery Mode until the Port Pair is Detached, there is a Hard Reset, or the Source removes power (except during a Power Role Swap or Fast Role Swap when the initial Source removes power in order for the new Source to apply power).

Each Source has a Local Policy, governing power allocation to its Ports. Sinks also have their own Local Policy governing how they draw power. A System Policy can be enacted over USB that allows modification to these local policies and hence management of overall power allocation in the system.

A USB Power Delivery Port supplying power is known as a Source and a Port consuming power is known as a Sink. There is only one Source Port and one Sink Port in each PD connection between Port Partners. At Attach the Source Port (the Port with Rp asserted) is also the DFP downstream facing port DFP and VCONN Source. At Attach the Sink Port (the Port with Rd asserted) is also the upstream facing port (UFP) and is not the VCONN Source.

Further details of USB Power Delivery are provided in Universal Serial Bus Power Delivery Specification, Revision 3.0 Version 1.2, 21 Jun. 2018 (current version, hereinafter USB Power Delivery Specification).

In typical embedded platforms, a PMIC is connected to an application processor via one or more low-pin count serial interfaces, such as an $I^2C$ bus. The $I^2C$ interface and associated protocol enables the application processor (also referred to as the host processor) to configure various registers and perform other functions over the two-pin interface. An interrupt signal is also commonly used to enable the PMIC to alert the application processor of various events.

As used herein, the term "low-pin count" interface or serial interface refers to a serial interface or bus with four or fewer pins, with an optional interrupt signal. Examples of low-pin count interfaces include $I^2C$, $I_3C$, Serial Peripheral Interface (SPI), Enhanced Serial Peripheral Interface Bus (eSPI), and System Management Bus (SMBus). The principle and teachings herein may be extended to future low-pin count interfaces. While the terminology "low-pin count link" and "low-pin count link interface" may be used herein interchangeably, a low-pin count interface includes a respective interface at each end of a link (i.e., the wiring) connecting the respective interfaces.

Adding support for USB Type-C power control in PMICs presents challenges that cannot be addressed with the conventional $I^2C$ implementation. In particular, the USB Power Delivery Specification defines timing requirements for USB Type-C that need to be met and are difficult to handle using a single serial channel to the PMIC controlled by the application processor using high-level operating system (OS) software. In addition, for power control, even though there are no standards-based timing requirement, low latency is a requirement to meet performance and quality requirements in various use-cases as a part of plug-and-play functionality.

To illustrate the problem, consider the following use case. A user is playing a graphics-intensive gaming application on a device, such as a mobile phone, using a battery power source. During the game, there can be interactions between the host and PMIC to control the voltage rails and read/write to the $I^2C$ registers in the PMIC (for battery level checking, haptic control, etc.). While the game is being played, the user notices the battery level has dropped, either by looking at the charge level or receiving a notification that the battery level has reached some threshold (such as 20% or 10%). In response, the user inserts a USB-C cable that is connected to a USB-C power adapter plugged into a wall outlet. As per the USB-C power delivery specification (and described in detail below with reference to FIGS. 8a and 8b), there is handshake of messages that has timing constraints as low as 24-30 ms for a response from the host (i.e., processor in the device).

This timing constraint is difficult to meet using the same host-to-PMIC interface, such as an $I^2C$ bus, used for power management, which as discussed above has its own low-latency requirements. To address these requirements, two or more physical interfaces are implemented between the host and PMIC, which increases manufacturing cost.

FIG. 1 shows an example of an architecture 100 illustrating further details of the communication paths between the host and PMIC and how the USB-C timing and low-latency power control requirements are met under a current approach. Architecture 100 includes a host processor SoC (System on a Chip) 102, also referred to as the application processor, host processor, or simply "host," which is connected to a PMIC 104. Host processor 102 includes a central processing unit (CPU) 106 on which software including an operating system 107 is executed, a power control unit (PCU) 108, and a power management controller (PMC 110). PMIC 104 includes a charging controller (CCNTL) 112, a USB Type-C Power Controller (TCPC) 114, and a plurality of registers, depicted as registers 116, 118, . . . , 120. PMIC 114 is configured to communicate with a battery charger 121 via a communication link 122, with the battery charger providing a power input (VBATT) to a battery 123, which in turn provides an input voltage VIN to PMIC 114. The input voltage VIN is conditioned and adjusted by the PMIC (e.g., using one or more DC-DC convertors) to supply power to host processor 102 via power rails 124, and to one or more peripheral device, as depicted by peripheral devices 126, 128, . . . , 130.

Host processor 102 communicates with PMIC 104 via two (as illustrated) or more communication links 132 and 134, such as two $I^2C$ buses, an $I^2C$ bus and an SMBus, or similar low-pin count links such as $I_3C$, SPI, and eSPI. In addition, each of communication links 132 and 134 includes one or more interrupt lines (not shown).

Architecture 100 also includes a USB Type-C interface 136, to which a USB DC power source 138 (also referred to as a USB charger) is connected via a USB-C cable 140. As further shown, USB Type-C interface 136 is connected to PMIC 104 via a portion of USB-C signal lines 142 and to host processor 102 via second portion of USB-C signal lines 144 connected to host processor 102. Further details of USB-C signal lines 142 and 144 are described below with reference to FIG. 3.

During operation, various data are communicated over communication links 132, 134, and USB signal lines 138. For example, CPU 106 uses communication link 132 to configure registers 116 and 118 and uses communication link 134 to communicate with TCPC 114. Meanwhile, some SOC entity communicates with charger controller 112 over communication link 132, while PMC 110 uses communication link 134 to configure register 120 and communicate with TCPC 114. In addition, USB DC power source 238 communicates with TCPC 214 using USB-C signal lines 142.

Figure 2:
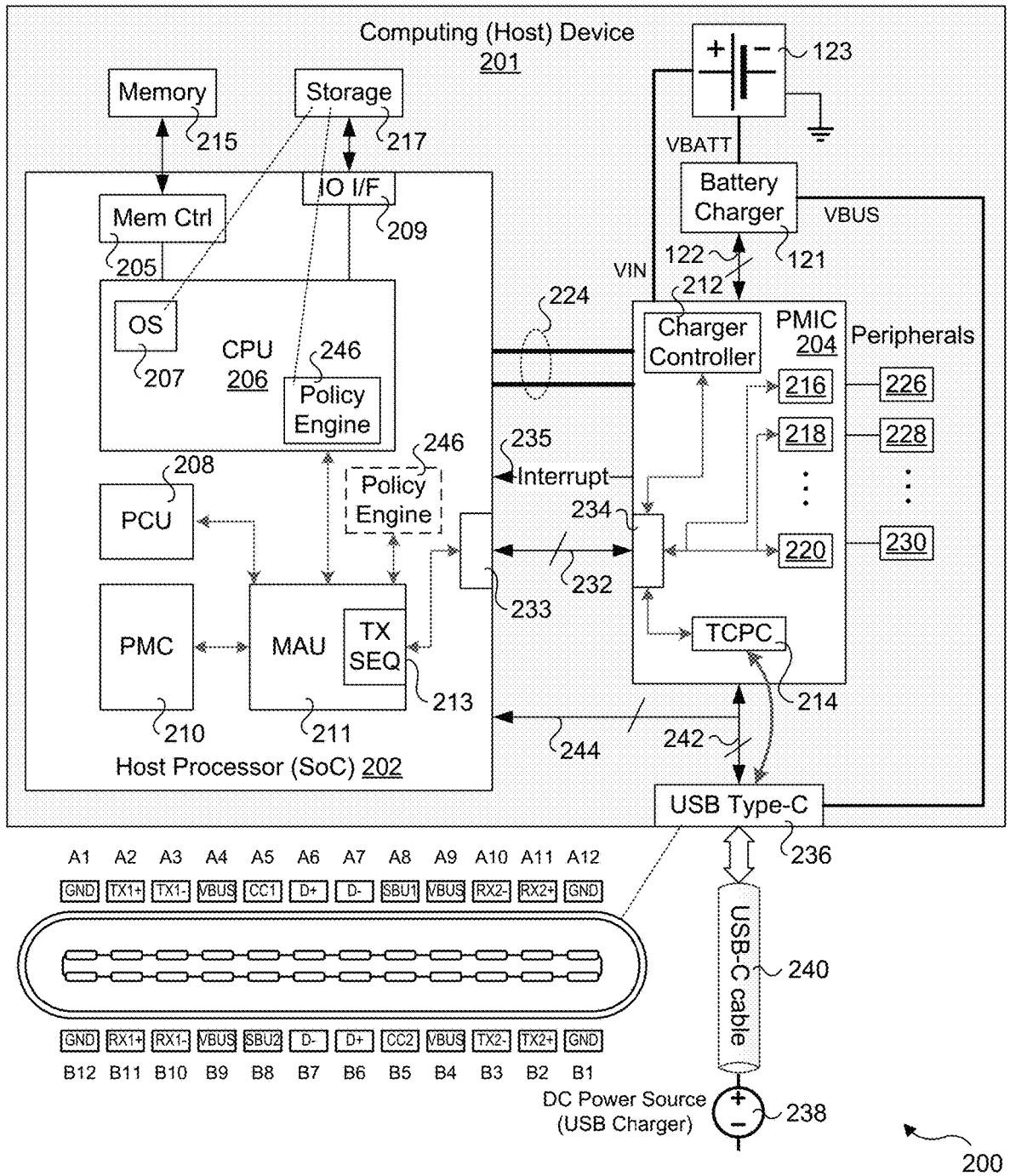
FIG. 2 is a schematic diagram illustrating an architecture having a single low-pin count communication link between a processor and PMIC configured to employ a priority-based message arbitration and delivery scheme, according to one embodiment.

FIG. 2 shows an architecture 200 in accordance with one embodiment that is configured to implement a single low-pin count interface between the host processor and the PMIC while meeting the timing requirements specified for USB-C power delivery. Architecture 200 includes a host processor 202 implemented as an SoC connected to a PMIC 204. Host processor 202 includes a memory controller 205, a CPU 206 on which software including an operating system 207 is executed, a PCU 208, an Input-Output (IO) interface (I/F) 209, a PMC 210, and a Message Arbitrator Unit 211 including a transmit sequencer 213. Memory controller 205 is coupled to memory 215 via one or more memory channels. One or more storage devices 217 in which one or more of software and firmware are stored are coupled to IO interface 209. In one embodiment (not shown), firmware is stored in a separate storage device than software.

PMIC 204 includes a charging controller 212, a TCPC 214, and a plurality of registers 216, 218, . . . , 220. PMIC 214 is configured to communicate with a battery charger 221 via a communication link 222, with the battery charger providing a power input (VBATT) to a battery 223, which in turn provides an input voltage VIN to PMIC 214. As before VIN is conditioned and adjusted by the PMIC (e.g., using one or more DC-DC convertors) to supply power to host processor 202 via power rails 224, and to one or more peripheral device, as depicted by peripheral devices 226, 228, . . . , 230.

Host processor 202 communicates with PMIC 104 via a single low-pin count communication link 232, which in one embodiment is an I²C bus coupled between an I²C interface 233 on host processor 202 and an I²C interface 234 on PMIC. In addition, an interrupt line 235 is employed to send an interrupt signal from PMIC 204 to host processor 202.

Architecture 200 further includes a USB Type-C interface 236, to which a USB DC power source 238 is connected via a USB-C cable 240. USB Type-C interface 136 is connected to PMIC 204 via a portion of USB-C signal lines 242 and to host processor 202 via second portion of USB-C signal lines 244 connected to host processor 202. Further details of USB-C signal lines 242 and 244 are described below with reference to FIG. 3.

During operation, various data are communicated over communication link 232 and USB signal lines 242, enabling various components in host processor 202 to communicate with charger controller 212, TCPC 214, and read from and write to registers 216, 218, . . . , 220, as described in further detail below. In addition, USB DC power source 238 communicates with TCPC 214 using USB-C signal lines 242.

As further shown, architecture 200 includes a policy engine 246. In one embodiment, policy engine 246 is implemented via software that is executed on CPU 206. The policy engine software is read from storage device 217 and loaded into memory 215. In another embodiment, policy engine 246 is implemented via embedded logic on host processor 202, such as by executing firmware instructions on an embedded processor or microcontroller, and/or through use of predefined logic (e.g., an embedded application-specific integrated circuit (ASIC)) or programmable logic, such as an embedded field programmable gate array (FPGA)).

Figure 3:
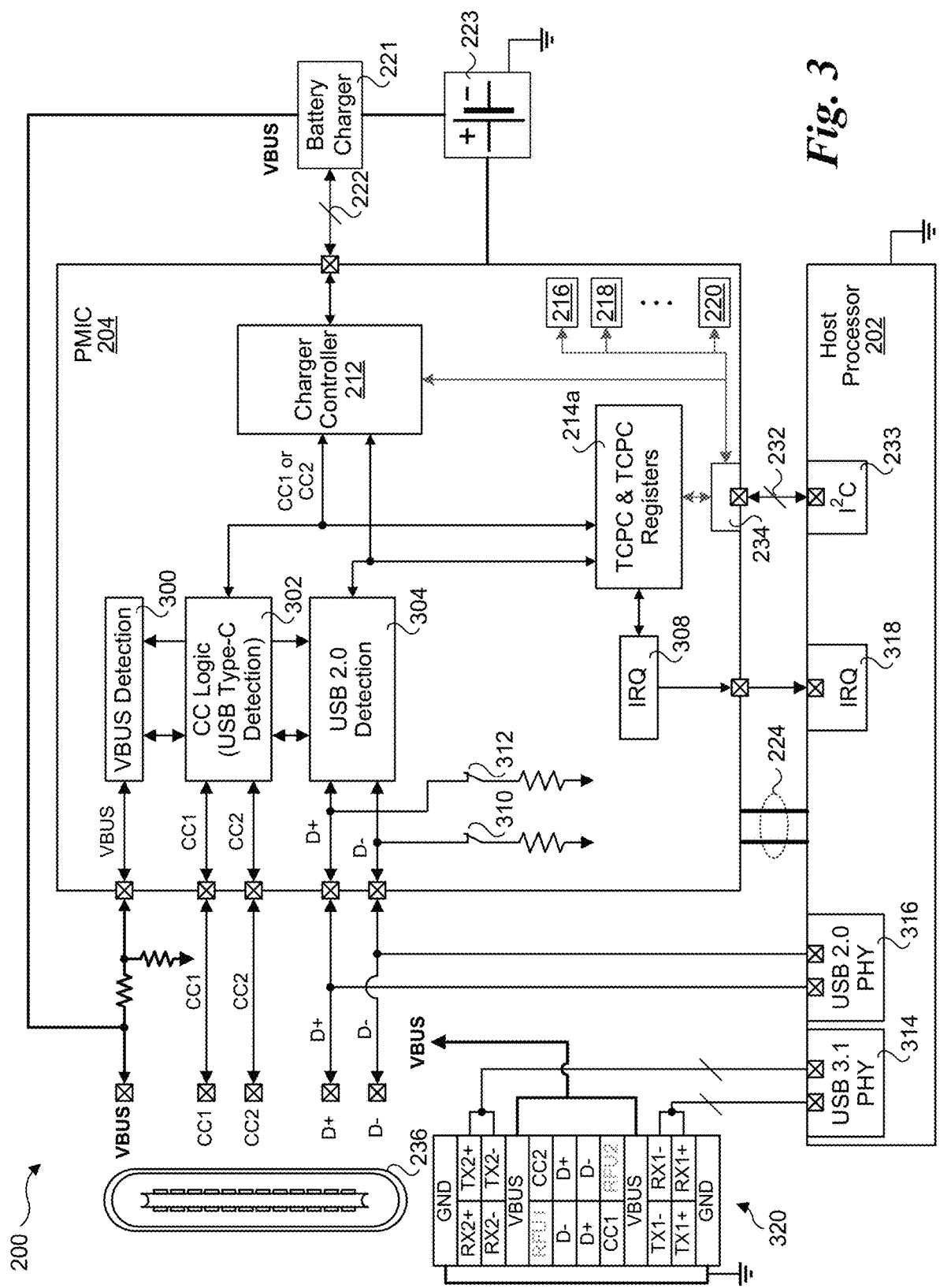
FIG. 3 is a schematic diagram showing further details of a PMIC and signals and voltage lines coupled between a USB Type-C interface and the PMIC, host processor, and battery charger.

FIG. 3 shows further details of architecture 200, according to one embodiment. In addition to the blocks and components illustrated in FIG. 2, PMIC 204 further includes a VBUS detection block 300, a CC logic block 302, a USB 2.0 detection block 304, an interrupt request (IRQ) block 308, a pair of switches 310 and 312, and a TCPC block with TCP registers 214a which is similar to TCPC 214. Host processor 202 is further depicted to include a USB 3.1 Physical Layer (PHY) block 314, and USB 2.0 PHY block 316, and an IRQ receive block 318.

During ongoing operations, a user may insert a USB-C cable into USB Type-C interface 236, or otherwise insert a USB-C plug of a USB-C device into USB Type-C interface 236 (such as a USB Type-C thumb drive). With respect to power considerations, the USB device may be generally classified as a USB power source or a USB power sink (or simply a USB source or USB sink). Some USB devices, such as a powered USB hub, may function as both a source or sink under different configurations and uses. A USB source provides (is the source of) power to the USB host device to which it is connected. Conversely, a USB sink receives power from the USB host device to which it is connected.

The USB Type-C specification (e.g., version 1.2) defines mechanisms (circuitry and logic) for detecting whether a USB device that is plugged into a USB-C interface (receptacle) is a USB source or USB sink. In addition, since the USB device might be a legacy device connected via a USB-C adapter, the USB Type-C specification detection mechanism supports detection of USB devices using a USB 2.0 interface. The mechanisms employ detection of the voltage level of the VBUS signal in combination with voltage levels of the CC1 and CC2 signals measured at the Configuration Channel (CC) pins CC1 and CC2 of the USB-C interface.

A pinout diagram 320 shows the various signals of a USB-C interface (shown with pin numbers A1-A12 and B1-B12 in FIG. 2). The USB-C interface is symmetrical, enabling a USB-C cable connector to be inserted into a USB-C port in one of two orientations (referred to a "right-side up" or "upside down"). The orientation is detected by CC logic block 302 by measuring voltage levels for signals CC1 and CC2 for pins CC1 and CC2. The detection process is initiated in response to insertion of a USB-C cable or device plug, which will result in the VBUS voltage level detected by VBUS detection block 300 and voltage levels for CC1 and CC2 being detected by CC logic block 302. Prior to insertion of the USB-C cable or plug, the path depicted from battery charger 221 to the VBUS pin will be open. As a result, if the USB device is a DC power source, a positive VBUS voltage level produced by the USB power source will be detected. If the USB device is a sink, the detected VBUS voltage level will be ground.

The voltage levels of signals CC1 and CC2 may also be used to detect what type of USB device has been inserted into a USB-C port, such as whether the device is a DC power source or if the USB device is a sink that requires power to operate, as well as whether the device is a USB-C device or a USB 2.0 legacy device. Once the connector orientation is determined, CC logic block 302 configures one of the CC1 and CC2 signals to be used for serial communication. As described below with reference to FIGS. 8a and 8b, serial communication signals using CC1 or CC2 are used to support communication between a USB power source and PMIC 204 to configure USB power delivery, which enables the USB power source to charge battery 223.

If a USB 2.0 device is coupled to a USB-C adapter or cable that is inserted, then only the USB 2.0 signals are used, which include D+ and D− data signals (one of the two USB 2.0 D+/D− signal pair will be connected, depending on the orientation). The presence of a USB 2.0 device will be detected by USB 2.0 detection block 304, which also is used to provide communication with TCPC 214a and charger controller 212.

The differential signal pairs to support SuperSpeed and SuperSpeed+signaling are connected to USB 3.1 PHY block 314, as shown. SuperSpeed and SuperSpeed+signaling is used to support high-speed communication between host processor 202 and a USB Type-C sink device.

As illustrated in FIG. 2 and discussed above, there is only a single low-pin count communication link between host processor 202 and PMIC 204. To enable sending and receiving data and messages with different timing requirements over such an interface (e.g., I²C), a novel arbitrator IP (Intellectual Property) block is introduced before the PHY block in the communication link (e.g., before the I²C PHY for an I²C bus).

This novel IP block is referred to as the Message Arbitrator Unit (MAU) introduced in FIG. 2 above. In one embodiment, the MAU provides the following functionality:

Support for multi-priority hardware queues into which messages coming from various clients are added, depending on the message priorities.

Support for automatic priority message arrival detection and transmit: Messages from the software, firmware and/or hardware IP that are to be sent to the PMIC have a header priority field in the message header defining the priority of the message. This priority field is read by the arbitrator when a message is received, and the message is enqueued to an applicable priority queue based on the priority in the priority field.

Message arbiter block: This block checks the various queues and picks the message from the highest priority queue and sends it to the transmitted over the communication link to the PMIC. It also tracks ongoing transmit and acknowledgement of the message transfer completion by the hardware IP.

The message arbiter block also supports ongoing transmission interruption and buffer flush capability: If there is an ongoing transfer of a lower priority message, the data arbiter can send a flush command to interrupt an ongoing transfer and initiate a transfer of a higher priority message.

The message arbiter block further supports late clearance multi-priority queues: This feature is implemented for cases where a lower priority message is flushed or interrupted to enable a higher priority message to be sent. In this case, the previous interrupted message will be resent. To be able to track messages sent or unsent, the data arbiter waits until it gets a message transmit complete acknowledgement to clear the previous sent message from the queue. This is called a late clearance multi-priority queue.

Flushed transmission message Retry: In the case where a higher-priority message interrupted a lower priority message transmit, then, post the higher priority message transfer completion, a retry of the lower priority message transmit is initiated by the message arbiter.

The following describes implementation aspects of the MAU. The MAU includes three or more prioritized transmit queues with decreasing order of transmit priority. The queues provide a way to guarantee a bounded transmit latency for a highest-priority message (and similarly for other message over the other lower-priority messages). The process works on the principle of message categorization (prioritization setting) at the message source, before putting into the messages into the prioritized transmit queues. The message headers format includes information identifying the message priority (such as a priority field or similar means). The message priority information is used to implement priority-based scheduling, as well as late buffer clearance to enable flushing and subsequent retransmission of ongoing transmission of a message if a highest-priority message arrives in the priority #1 (highest-priority) queue.

When a higher-priority message lands in the queue while a lower priority message is being transmitted, the data arbiter sends a flush signal to the transmit sequencer. The transmit sequencer then aborts the ongoing transmission (via insertion of a STOP or a NAK and STOP into the message flow over I²C interfaces) as shown in the FIGS. 6 and 7 below (Aborted Transmission). Once the ongoing transaction is aborted, the arbiter then flushes the FIFOs in preparation for next transaction.

Figure 4:
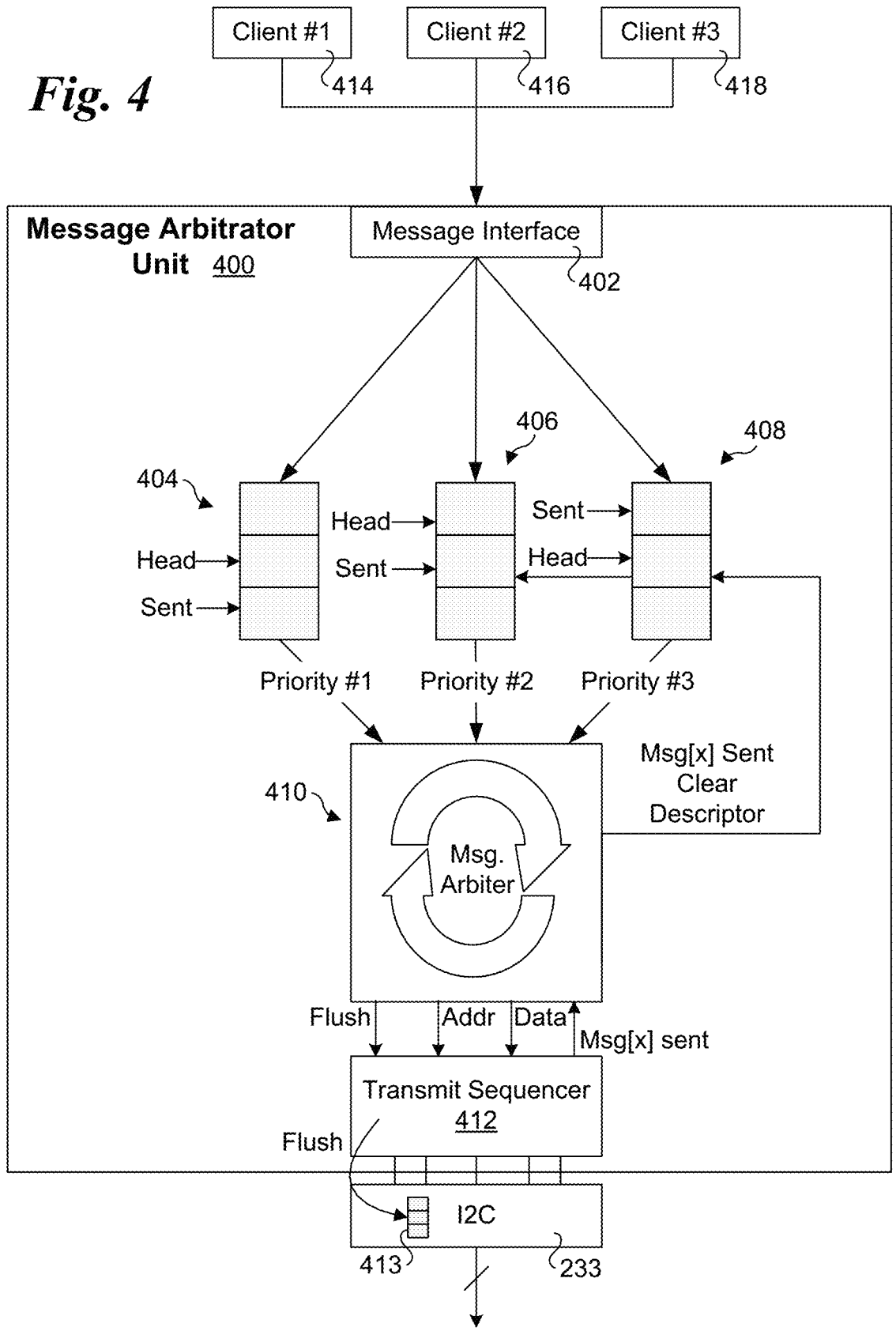
FIG. 4 is a schematic diagram of a message arbitration unit (MAU), according to one embodiment.

An exemplary implementation of an MAU 400 is shown in FIG. 4. MAU 400. MAU 400 includes a message interface 402, three priority queues 404, 406, and 408, a message arbiter 410, and a transmit sequencer 412. In one embodiment, message interface 402 is a memory-mapped register set used by various clients to communicate with MAU 400. As further depicted, I²C interface 233 includes a transmit First-in, First-out (FIFO) buffer 413. In one embodiment, a priority queue is implemented as a circular FIFO queue including a Head pointer and a Sent pointer. It is further noted that the use of three priority levels in the illustrated embodiment of MAU 400 is merely exemplary and non-limiting. Generally, three or more priority levels may be implemented.

Transmit sequencer 412 operates as the interface between the data arbiter 410 and I²C interface 233, and is implemented using a protocol sequencer IP block that helps to translate the transmitted and received messages into the appropriate protocol of the underlying interface (e.g., I²C protocol for an I²C interface).

During operation, messages to be sent to the PMIC are received from various clients (as depicted by clients 414, 416, and 418) at message interface 402, which operates as a mailbox interface. For example, clients 414, 416, and 418 may include a CPU, a PCU, a PMC, as well as a software application or embedded application such as a policy engine. The messages received at message interface 402 are then processed by MAU 400.

Figure 5:
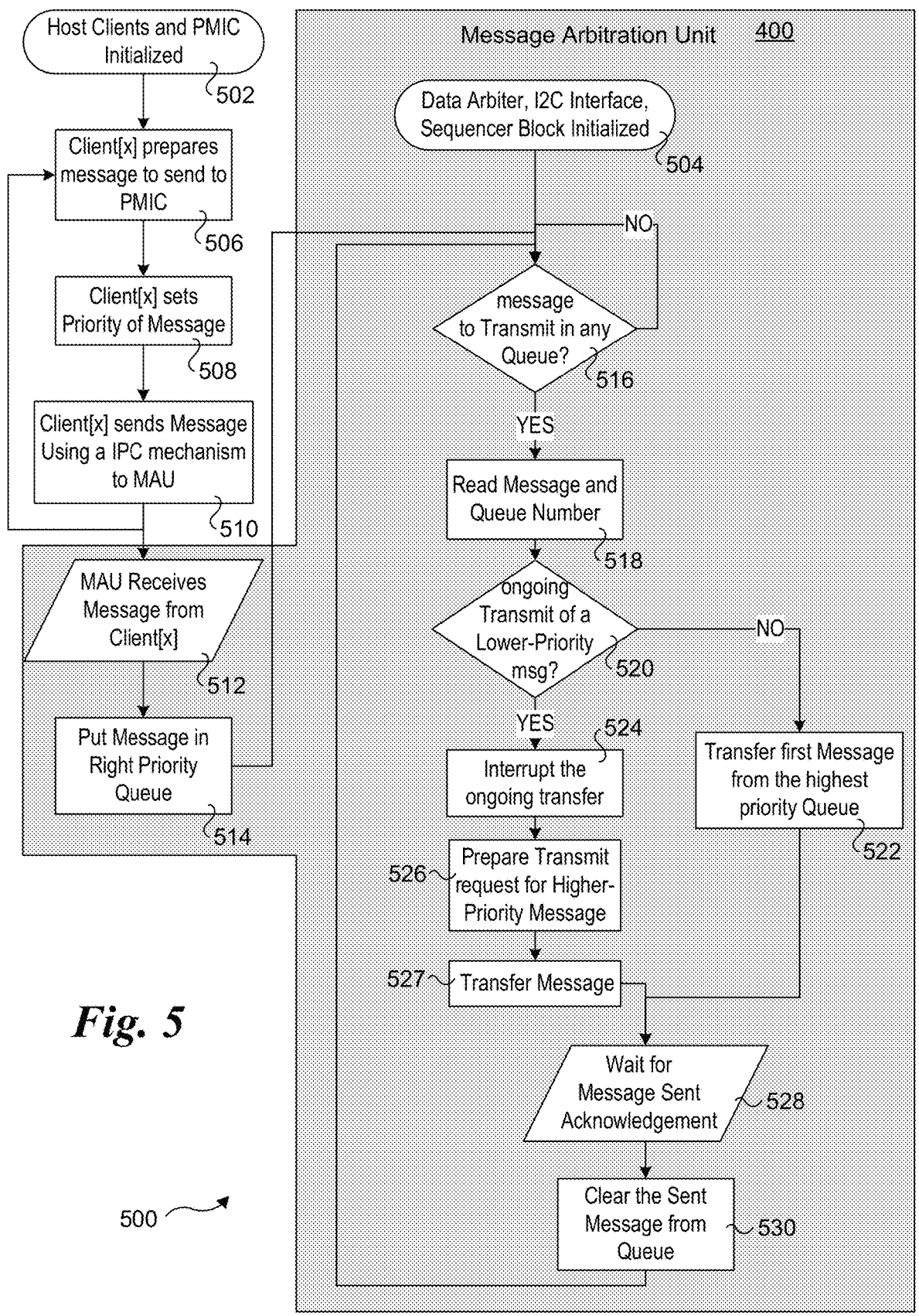
FIG. 5 is a flowchart illustrating operations and logic implemented by message clients and an MAU, according to one embodiment.

In one embodiment, MAU 400 is configured to implement operations and logic illustrated in flowchart 500 of FIG. 5. The operations depicted with a white background are performed in an ongoing manner by the MAU clients. Meanwhile, the operations depicted with a grey background are performed in an ongoing manner by the MAU.

During initialization of the system or device in which architecture 200 is implemented, host clients and the PMIC are initialized, as shown in a start block 502. In addition, the data arbiter, I²C interface, and transmit sequencer block on the MAU are initialized, as depicted by a start block 504. During ongoing operations, the host clients will prepare messages to send to the PMIC, and set the priority of each message, as respectfully depicted in blocks 506 and 508. In a block 510, the messages are then sent to the MAU using a message interface. As depicted by the loop back to block 506, the operations of blocks 506, 508, and 510 are performed in an ongoing manner for each message that is to be sent to the PMIC.

Continuing with operations performed by the MAU, in a block 512 the messages are received at the message interface of the MAU, and the message is enqueued in one of the priority queues based on the priority setting for the message. For example, as described below, in one embodiment the message includes a header having a priority field in which the priority is set.

As depicted by the decision block 516 and its corresponding NO loop, during ongoing operations the priority queues will be checked to see if there are any messages to transmit. In the embodiment illustrated in FIG. 4, the Head pointer points to a slot in the queue that is currently at the head of the queue. When a message has been successfully sent to the PMIC, the Sent pointer is advanced. As a result, if the Head pointer is different than the Sent pointer (i.e., they point to different slots in the FIFO queue) there is one or more messages in the queue, and the answer to decision block 516 is YES, causing the logic to proceed to block 518 in which the message and queue number are read by the data arbiter.

Operations and logic illustrated in a decision block 520 and blocks 522, 524, 526, 528, and 530 are performed by the MAU to enable transmission of messages based on their priorities. In decision block 520, a determination is made to whether there is an ongoing (i.e., current) transmission of a lower-priority message. For example if the message in block 518 is read from a queue with a higher-priority that a message that is currently being transmitted, the answer to decision block 520 will be YES, while if the message read from a queue in block 518 has the same priority or a lower priority than a currently transmitted message, the answer to decision block 520 will be NO. In addition, if no message is currently being transmitted, the answer to decision block 520 will also be NO. If the answer is NO, the logic proceeds to a block 522 in which the first message from the highest priority queue is transferred (i.e., sent over the I²C bus to the PMIC). Conversely, if the answer to decision block 520 is YES, ongoing transfer of the message is interrupted in block 524, and a request to transmit the higher-priority message is prepared in block 526, followed by the message being transferred in a block 527.

In block 528, the process waits for an acknowledgement (ACK) from the PMIC that confirms the sent message has been successfully received. Once the ACK has been received, the successfully sent message is cleared from the applicable priority message queue in block 530 by advancing the Sent pointer for that queue. The logic then loops back to decision block 516, illustrating that the operations are repeated on an ongoing basis.

Figure 6:
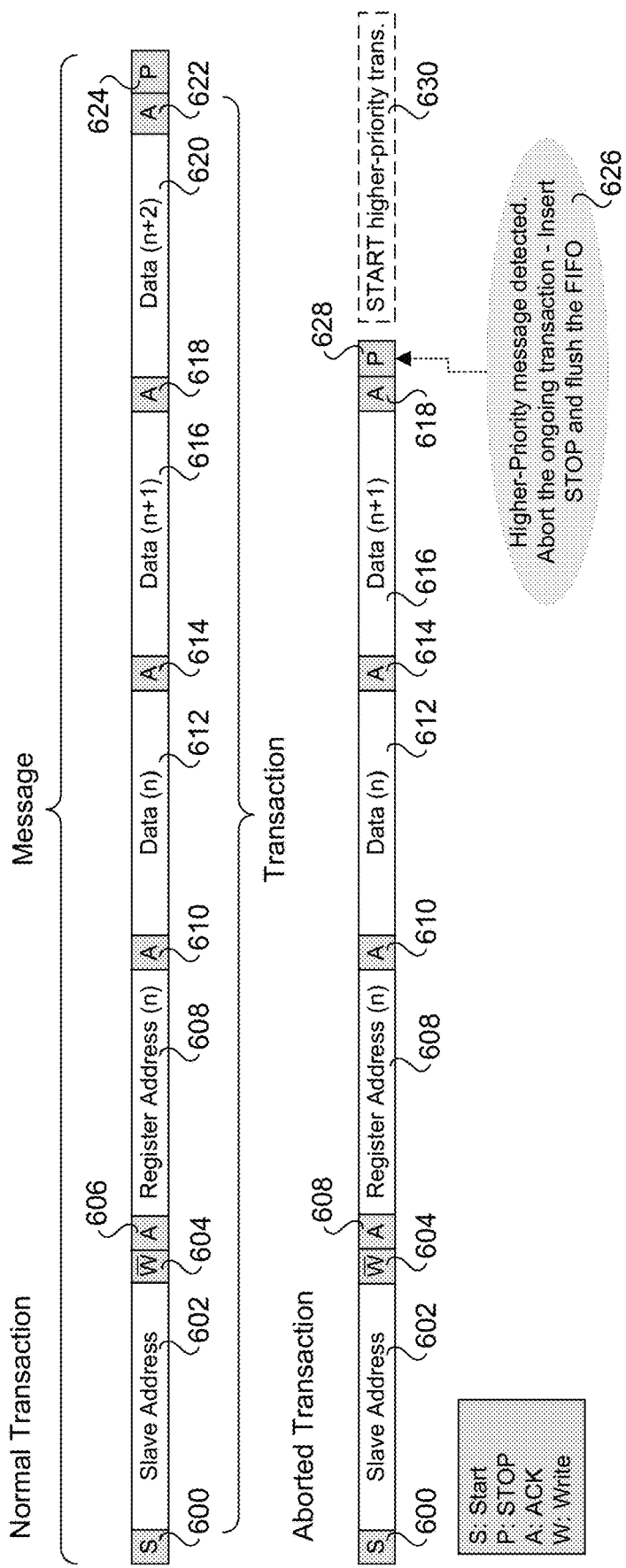
FIG. 6 is a message sequence diagram illustrating a normal transaction and an aborted transaction corresponding to a 3-byte data write.

FIG. 6 shows an example of a three-byte data write to a PMIC receiver. The upper row shows transmission sequence corresponding to a normal transaction. The lower row shows a transmission sequence corresponding to an aborted transaction.

Figure 7:
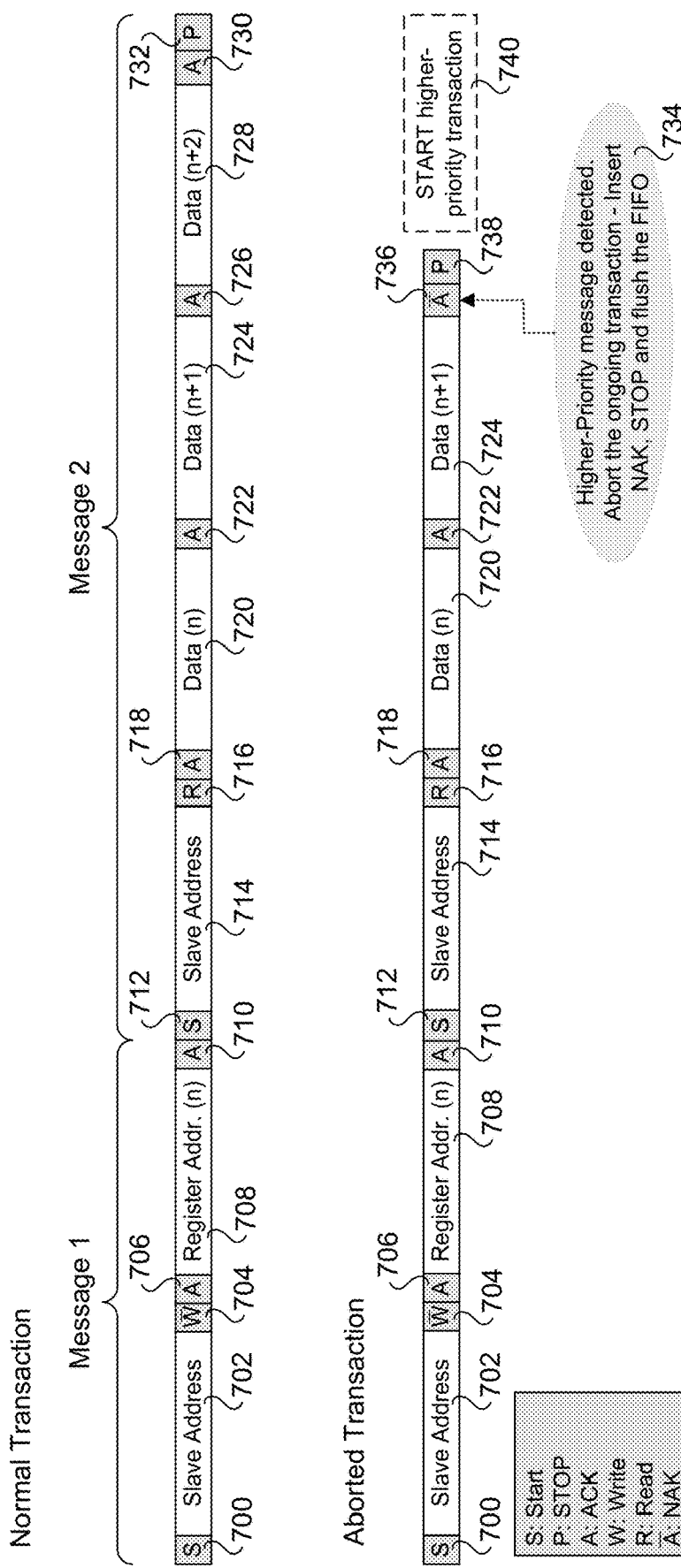
FIG. 7 is a message sequence diagram illustrating a normal transaction and an aborted transaction corresponding to a 3-byte data read.

The I²C protocol provides a master-slave implementation under which an I²C master communicates with an I²C slave using I²C messages that are transmitted as a sequence of message segments called "frames." Under the transmission sequences illustrated in FIGS. 6 and 7, each transmitted frame is acknowledged by the receiver, either via a positive ACK or a negative acknowledgement (NACK).

As shown in to upper row of FIG. 6, a normal transaction sequence begins with a first frame including start condition 600, followed by a first frame including a 7-bit slave address 602 and a Read/Write bit 604 that is cleared (bit value is '0') to indicate a Write. In response, to successfully receiving the first frame, the I²C slave returns an ACK 604. The next frame includes a register address 608, which again is followed by an ACK 610. Next, three data frames 612, 616, and 620 are transmitted in sequence, with each data frame acknowledge by respective ACKs 614, 618, and 622. The last ACK 622 is followed by a stop condition 624.

The aborted transaction proceeds in the same manner as the normal transaction up until a higher-priority message is detected, as indicated by bubble 626. In response, the ongoing transaction is aborted by inserted a stop condition 628, and the I²C transmit FIFO 413 is flushed. The higher-priority transaction 630 is then started.

FIG. 7 illustrates a normal transaction and aborted transaction corresponding to a three-byte data read under which data is read from a register on the PMIC. The transaction includes a first message that is used to identify the PMIC register, and a second message used to transfer the three bytes of data read from the PMIC register.

The first message begins with a start condition 700, followed by a slave address 720 and a R/W bit 704 set to Write. In response to receiving this first frame, the PMIC returns and ACK 706. The master then sends the register address 708, which again is acknowledged by the PMIC with an ACK 710. The second message begins with a start condition 712, a slave address 714, and a R/W bit 716 set to Read (bit value is '1'). The PMIC returns an ACK 718. The PMIC then returns three bytes of data in data frames 720, 724, and 728, each acknowledged by the master, as depicted by respective ACKs 722, 726, and 730. The end of the transaction is then indicated by a stop condition 732.

The aborted read transaction proceeds the same as the normal transaction up until a higher-priority message is detected, as depicted in a buffer 734. The ongoing read transaction is aborted by inserting a NACK 736 followed by a stop condition 738 and flushing the I²C transmit FIFO 413. The higher-priority transaction 740 is then started.

Figure 8A:
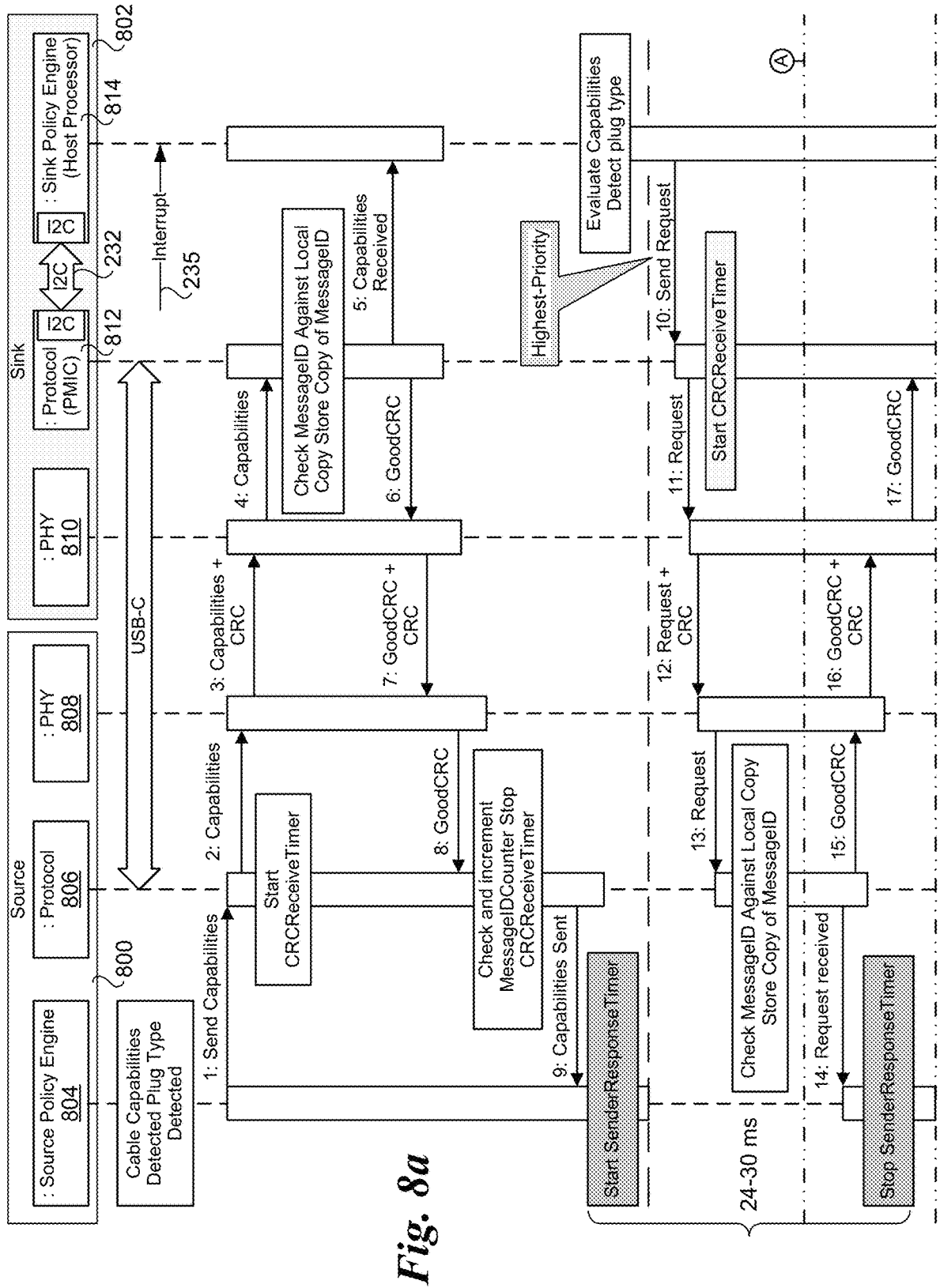
FIGS. 8a and 8b are respective portions of a message flow diagram and timing sequence for a USB power negotiation process, according to one embodiment.
Figure 8B:
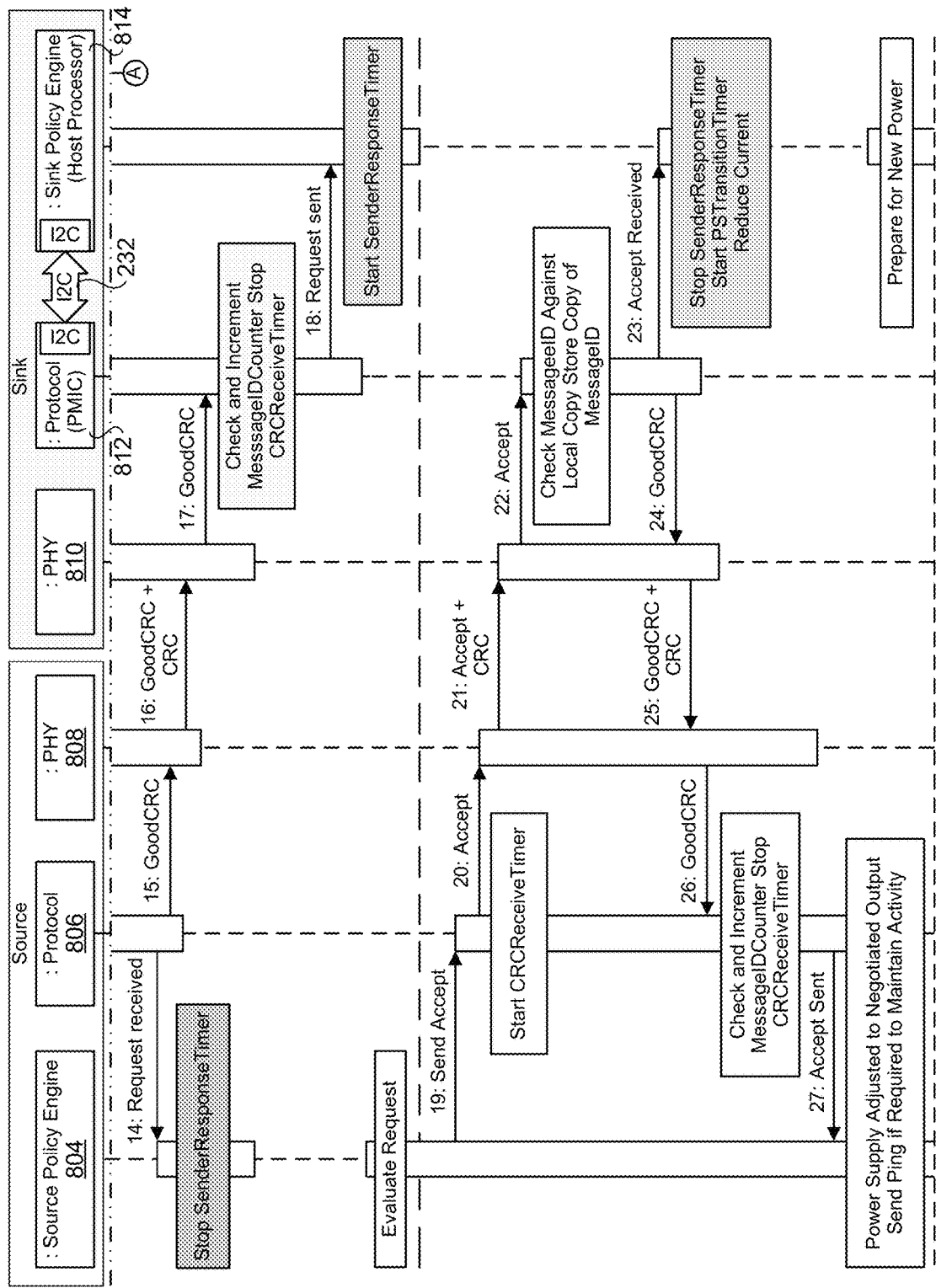

FIGS. 8a and 8b depict an augmented version of the communication flows and sequences as defined by the USB Power Delivery Specification while negotiating an Explicit Contract. The communication is between a USB PD source 800 and a USB PD sink 802. In the context of architecture 200, the USB PD source is DC USB power source 238 and the sink is computing device 201. USB PD source 800 includes a source policy engine 804, a USB-C protocol layer 806, and a USB-C PHY 808. USB PD sink 802 includes a USB-C PHY 810 a USB-C protocol layer 812 implemented in the PMIC, and a sink policy engine 814, which under architecture 200 is policy engine 246. As further depicted, USB-C messages are transferred between USB-C protocol layers 806 and 812, while I²C messages are transferred between USB-C protocol layer 810 and sink policy engine 812.

Various types of battery-powered computing devices may include one or more USB-C ports that may be implemented as both a USB-C source port and a USB-C sink port. For example, USB-C ports on computing devices such as mobile phones and tables may be used both for charging (the USB-C port is operating a sink) and for communicating and/or data transfers (the USB-C port is operating a source). Similarly, while the USB-C ports in laptops, notebooks, and Chromebooks are generally used for communication with USB devices and endpoints, they may also be used to receive power in some embodiments.

The negotiation of the Explicit Contract includes five distinct phases:
1. The Source sends out its power capabilities in a Source_Capabilities Message.
2. The Sink evaluates these capabilities and in the request phase selects one power level by sending a Request Message.
3. The Source evaluates the request and accepts the request with an Accept Message.
4. The Source transitions to the new power level and then informs the Sink by sending a PS_RDY Message.
5. The Sink starts using the new power level.

The message flows and associated operations for negotiating an Explicit Contract are defined in the Power Negotiation section of the USB Power Delivery Specification. The negotiation begins when a USB-C plug of a USB-C cable connected to the USB PD source is inserted into a USB-C receptacle on the USB PD sink. For example, under architecture 200 the user would insert a plug of USB-C cable 248 into a USB-C receptacle in USB Type-C interface 236. In response, as depicted in step 1, the Cable Capabilities or Plug Type are detected if these are not already known. The Policy Engine directs the Protocol Layer to send a Source_Capabilities Message that represents the power supply's present capabilities. In step 2, Protocol Layer 806 creates the Source_Capabilities Message, passes the message to PHY 808, and start CRCReceiveTimer. In step 3, PHY 808 appends a CRC (Cyclic Redundancy Check) and sends the Source_Capabilities Message to PHY 810, which receives the message and checks the CRC to verify the message.

In step 4, PHY 810 removes the CRC and forwards the Source_Capabilities Message to Protocol Layer 812. In step 5, Protocol Layer 812 checks the MessageID in the incoming Message is different from the previously stored value and then stores a copy of the new value. The Protocol Layer then forwards the received Source_Capabilities Message information to Sink Policy Engine 814, which consumes the message. In step 6, Protocol Layer 812 generates a GoodCRC Message and passes it PHY 810. During step 7, PHY 810 appends a CRC and sends the GoodCRC Message to PHY 808, which removes the CRC and forwards and forwards the GoodCRC Message to Protocol Layer 806.

In step 9, Protocol Layer 806 verifies and increments the MessageIDCounter and stops the CRCReceiveTimer. Protocol Layer 806 then informs Source Policy Engine 804 that the Source_Capabilities Message was successfully sent. Source Policy Engine 804 the starts a SenderResponseTimer.

In step 10, Sink Policy Engine 814 evaluates the Source_Capabilities Message sent by the Source, detects the plug type if this is necessary and selects which power it would like. Sink Policy Engine 814 tells Protocol Layer 812 to form the data (e.g. Power Data Object) that represents its Request into a Message. In step 11, Protocol Layer 812 creates the Request Message and passes to PHY 810. Protocol Layer 812 then starts a CRCReceiveTimer.

In step 12, PHY 810 appends a CRC and sends the Request Message to PHY 808, which receives the Request Message and compares the CRC it calculated with the one sent with the Request Message to verify the Request Message. In step 13, PHY 808 removes the CRC and forwards the Request Message to Protocol Layer 806. In step 14, Protocol Layer 806 checks the MessageID in the incoming Message is different from the previously stored value and then stores a copy of the new value. Protocol Layer 806 then passes the Request information to Source Policy Engine 804. In response to receiving the Request information, Policy Engine 804 stops the SenderResponseTimer.

As defined in section 6.6.2 of the USB Power Delivery Specification, The SenderResponseTimer shall be used by the sender's Policy Engine to ensure that a Message requesting a response (e.g. Get Source_Cap Message) is responded to within a bounded time of tSenderResponse. Failure to receive the expected response is detected when the SenderResponseTimer expires.

The SenderResponseTimer Shall be started from the time the last bit of the GoodCRC Message EOP (i.e. the GoodCRC Message corresponding to the Message requesting a response) has been received by the Physical Layer. The SenderResponseTimer shall be stopped when the last bit of the expected response Message EOP has been received by the Physical Layer. The receiver of a Message requiring a response Shall respond within tReceiverResponse in order to ensure that the sender's SenderResponseTimer does not expire.

The value for tSenderResponse is defined to be between 24 and 30 milliseconds (ms). To meet this timing requirement, the Request sent from Sink Policy Engine 814 to protocol layer 812 during step 10 is sent as a highest-priority message using the message arbitration and prioritization scheme described above.

In the further detail, while the USB Power Delivery Specification defines the operation and performance requirements for a PD Sink, it doesn't define the internal structure of the PD Sink. Under some implementations, all the operations (relating to negotiating the Explicit Contract) are performed by a single component, and the tSenderResponse timing requirement can be easily met. However, under both architectures 100 and 200 the Sink Protocol Layer is implemented in the PMIC, while the Sink Policy Engine is implemented by the host processor, which is separate from the PMIC.

The way the tSenderResponse timing requirement is met under architecture 100 is through use of separate communication links, one of which can be dedicated for communication with the TCPC. For architecture 200, which only has a single communication link, prioritized message delivery (as implemented by the MAU) is used to meet the tSenderResponse timing requirement.

Figure 9:
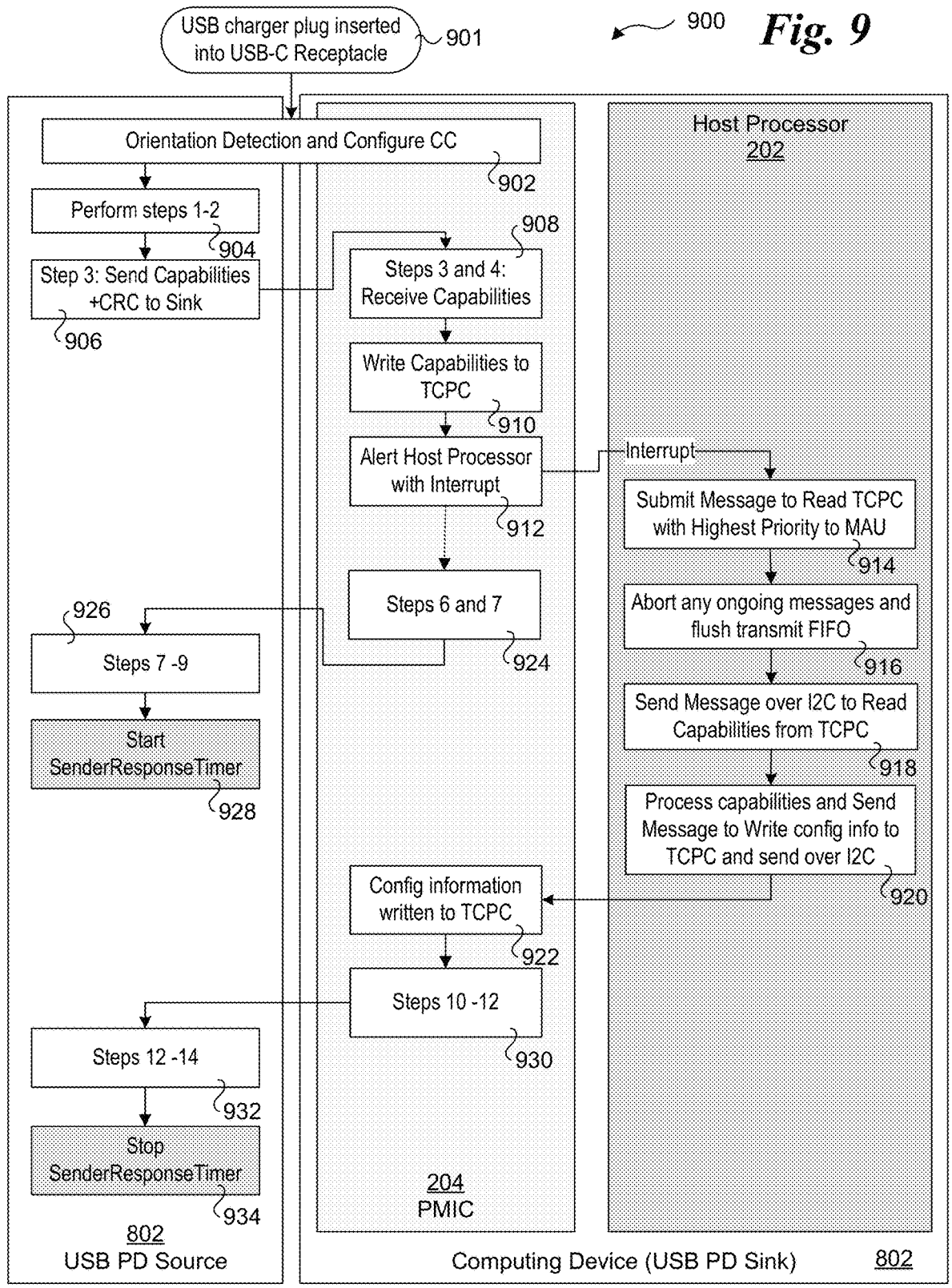
FIG. 9 is a flowchart illustrating further details of the communications and operations implemented by a USB power delivery (PD) source, a PMIC, and a host processor during the USB power negotiation process of FIGS. 8a and 8b.

FIG. 9 shows a flowchart 900 depicting further operations performed by PMIC 204 and host processor 202 during the USB power negotiation process of FIGS. 8a and 8b. The process begins in a start block 901 in which a USB charger plug is inserted into a USB-C receptacle on the computing device, which operates as USB PD sink 802. In a block 902, the plug orientation is detected and the CC communication channel is configured to enable communication between USB PD source 802 (e.g., the USB charger) and PMIC 204. Steps 1-2 and 3 are performed by USB PD source 802, as depicted by blocks 904 and 906. Steps 3 and 4 are performed by PMIC 204, as depicted in a block 908. In a block 910 the information relating to the capabilities are written to the TCPC (e.g., written to a TCPC register). In a block 912 the PMIC asserts an interrupt to alert host processor 202 that a USB PD event has been detected.

In response to the interrupt, policy engine 246 on host processor 202 generates a message to read the TCPC register and submits the highest-priority Read message to the MAU. If there is a message being transmitted, transmission of the message is aborted, and the transmit FIFO in the transmit sequencer is flushed, as depicted in a block 916. The Read message is then sent over the $I^2C$ bus to the PMIC to read the capabilities information from the TCPC registers in a block 918. In a block 920, the capabilities information that has been read (and returned to policy engine 246 after being received at the I²C on the processor) is processed by the policy engine, which generates a TCPC Write message to write configuration information to the TCPC register; as before this Write message is submitted to the MAU with the highest-priority level. As depicted in a block 922, the configuration information is written to the TCPC register.

Returning to block 912, either following the interrupt or before the interrupt, steps 6 and 7 are performed by the PMIC, as depicted in a block 924, and then steps 7-9 are performed by USB PD source 802, as depicted in a block 928. The SenderResponseTimer is then started in a block 928.

Returning to block 922, after the TCPC configuration information is written, PMIC 204 performs steps 10-12 in a block 930, followed by steps 12-14 being performed by USB PD source 802, as depicted in a block 932. The SenderResponseTimer is then stopped in a block 934.

Returning to FIGS. 8*a* and 8*b*, steps 15-27 are performed in the manner illustrated and as described in Table 8-5 of the USB Power Delivery Specification. As before, steps 18 and 23 employ communication over the I²C bus between the PMIC and the host processor. Also, as before, prioritized messaging using the MAU is implemented for communication between the PMIC and the host processor.

Under the embodiments described herein, the USB-C power negotiation timing requirements can be met using a single low-pin count link between a host/application processor and PMIC while also supporting communication between various clients on the processor and the PMIC. Moreover, the arbitrated prioritization scheme implemented in the MAU provides guaranteed transmit times for the highest-priority queue. This approach removes the need for a second interface between the processor and PMIC, saving pin count between the processor and PMIC, and reducing cost.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a computing device including a processor comprising a first component having a hardware-based message arbitration unit (MAU) including a plurality of priority queues, each having a respective priority level, coupled to a second component via a low-pin count link, comprising:
   receiving, at the MAU from two or more clients on the processor, messages having different priority levels to be sent over the low pin-count link to the second component;
   enqueuing the messages in the plurality of priority queues based on a priority level for each message; and
   arbitrating transmission of messages over the low-pin count link based on the priority level of messages in the plurality of priority queues.

2. The method of claim 1, further comprising:
   enqueuing a first message in a first priority queue having a first priority;
   beginning transmission of the first message over the low-pin count link to the second component;
   detecting a second message has been enqueued in a second priority queue having a higher-priority than the first priority queue, and in response thereto,
   aborting transmission of the first message; and
   transmitting the second message over the low-pin count link to the second component.

3. The method of claim 2, further comprising:
   implementing a message arbiter that selects messages from the plurality of priority queues;
   implementing a transmit sequencer to translate messages selected by the message arbiter into a protocol implemented by the low-pin count link and buffer at least one of translated messages and translated message segments prior to transmission over the low-pin count link; and
   in response to detecting the second message has been enqueued in the second priority queue, flushing any messages or message segments that are currently buffered.

4. The method of claim 1, wherein the second component is a Power Management Integrated Circuit (PMIC), and the two or more clients on the processor include at two or more of:
   software executing on the processor;
   a power control unit;
   a power management controller; and
   a Universal Serial Bus (USB) policy engine.

5. The method of claim 4, wherein the computing device includes a USB Type-C receptacle having a plurality of pins including CC1 and CC2 pins coupled to the PMIC, the method further comprising:
   detecting a USB Type-C plug coupled to a USB power source has been inserted into the USB Type-C receptacle;
   configuring a CC communication channel between the USB power source and the PMIC using one of the CC1 and CC2 pins; and
   performing a USB power negotiation process under which the USB power source operates as a USB power delivery (PD) source, and the computing device operates as a USB PD sink, wherein during the power negotiation process messages are communicated between a sink policy engine implemented on the processor and the PMIC using the low-pin count link, and messages are communicated between the PMIC and the USB power source using the CC communication channel.

6. The method of claim 5, further comprising:
   implementing a USB Type-C Power Controller (TCPC) on the PMIC including one or more TCPC registers;
   receiving capability information sent from the USB power source to the PMIC;
   updating a TCPC register with the capability information;
   implementing a read message that is transmitted over the low-pin count link to enable the sink policy engine to read the TCPC, the read message having a highest-priority level and being arbitrated by the MAU;
   processing information read from the TCPC register using the sink policy engine;
   implementing a write message that is transmitted over the low-pin count link to enable the sink policy engine to write to a TCPC register, the write message having a highest-priority level and being arbitrated by the MAU.

7. The method of claim 5, further comprising implementing the sink policy engine using embedded logic on the processor.

8. The method of claim 4, wherein the two or more clients include the policy engine, further comprising:
   transmitting a first message originating from a first client that is not the policy engine over the low-pin count link to the PMIC;
   detecting a second message received by the MAU from the policy engine is enqueued in a highest-priority queue in the MAU, and in response thereto,
   aborting transmission of the first message; and
   transmitting the second message over the low-pin count link to the PMIC.

9. The method of claim 1, wherein the low-pin count link comprises an I2C bus.

10. A System on a Chip (SoC), comprising:
    a central processing unit (CPU) on which software is executed;

a plurality of clients;
a low-pin count interface; and
a message arbitration unit (MAU) including a plurality of priority queues, each having a respective priority level,
wherein the SoC is configured to,
receive, at the MAU from two or more of the plurality of clients, messages having different priority levels to be transmitted from the low pin-count interface to a component communicatively coupled to the SoC via a low pin-count link coupled to the low pin-count interface when the SoC is installed in a computing device including the component;
enqueue the messages in the plurality of priority queues based on a priority level for each message; and
arbitrate transmission of messages from the low-pin count interface based on the priority level of messages in the plurality of priority queues.

11. The SoC of claim 10, wherein the SoC is further configured to:
enqueue a first message in a first priority queue having a first priority;
transmit the first message from the low-pin count interface to the component;
detect a second message has been enqueued in a second priority queue having a higher-priority than the first priority queue;
abort transmission of the first message; and
transmit the second message from the low-pin count interface to the component.

12. The SoC of claim 11, wherein the MAU includes:
a message arbiter configured to select messages from the plurality of priority queues; and
a transmit sequencer configured to translate messages selected by the message arbiter into a protocol implemented by the low-pin count interface and buffer at least one of translated messages and translated message segments in a first-in, first-out (FIFO) buffer prior to transmission from the low-pin count interface,
wherein in response to detecting the second message has been enqueued in the second priority queue, the MAU is configured to flush the FIFO buffer.

13. The SoC of claim 10, wherein the component is a Power Management Integrated Circuit (PMIC), and the plurality of clients on the processor include two or more of:
software executing on the processor;
a power control unit;
a power management controller; and
a Universal Serial Bus (USB) policy engine.

14. The SoC of claim 13, wherein the computing device includes a USB Type-C receptacle having a plurality of pins including CC1 and CC2 pins coupled to the PMIC, and wherein the SoC includes a USB policy engine implemented via embedded logic that is configured to operate as a sink policy engine to support a USB power negotiation process defined by a USB power delivery standard, wherein during the power negotiation process messages are communicated between the sink policy engine and the PMIC over the low-pin count link and using the MAU.

15. The SoC of claim 14, wherein the PMIC includes a USB Type-C Power Controller (TCPC) including one or more TCPC registers, and wherein the SoC is configured to
implement a read message that is transmitted over the low-pin count link to enable the sink policy engine to read a TCPC register, the read message having a highest-priority level and being arbitrated by the MAU;
processing information read from the TCPC register using the sink policy engine; and
implementing a write message that is transmitted over the low-pin count link to enable the sink policy engine to write to a TCPC register, the write message having a highest-priority level and being arbitrated by the MAU.

16. The SoC of claim 15, wherein the SoC is further configured to:
begin transmitting a first message originating from a first client that is not the sink policy engine from the low-pin count interface to the PMIC;
detect a second message received by the MAU from the sink policy engine is enqueued in a highest-priority queue in the MAU, and in response thereto,
abort transmission of the first message; and
transmit the second message from the low-pin count interface to the PMIC.

17. The SoC of claim 10, wherein the low-pin count interface is an I2C interface and the low-pin count link is an I2C bus.

18. A computing device, comprising:
a processor, comprising:
a central processing unit;
a memory controller;
an Input-Output (TO) interface;
at least one of a power control unit (PCU) and a power management controller (PMC);
a first low-pin count interface; and
a message arbitration unit (MAU) including a plurality of priority queues, each having a respective priority level;
memory, coupled to the memory controller;
at least one storage device coupled to the IO interface, having at least one of software and firmware stored therein;
a power management integrated circuit (PMIC) having a second low-pin count interface coupled to the first low-pin count interface via a low pin-count communication link, a charger controller, and a plurality of registers;
a battery, including a positive terminal providing input voltage to the PMIC; operatively coupled to the PMIC;
one or more power rails, coupled between the PMIC and the processor; and
an interrupt line, coupled between the PMIC and the processor,
wherein the computing device is configured to,
receive, at the MAU from a plurality of clients including the PCU, PMC, and the CPU, messages having different priority levels to be sent over the low pin-count communication link to the PMIC;
enqueue the messages in the plurality of priority queues based on a priority level for each message; and
arbitrate transmission of messages over the low-pin count communication link based on the priority level of messages in the plurality of priority queues.

19. The computing device of claim 18, further configured to:
receive a first message at the MAU having a first priority level;
enqueue the first message in a first priority queue in the MAU having a first priority;
begin transmitting the first message over the low-pin count communication link to the PMIC;
detect, during transmission of the first message, a second message has been enqueued in a second priority queue in the MAU having a higher-priority than the first priority queue;

abort transmission of the first message; and
transmit the second message over the low-pin count communication link to the PMIC.

20. The computing device of claim 19, wherein the MAU further includes:
   a message arbiter configured to select messages from the plurality of priority queues; and
   a transmit sequencer configured to translate messages selected by the message arbiter into a protocol implemented by the first and second low-pin count interfaces and buffer at least one of translated messages and translated message segments in a first-in, first-out (FIFO) buffer prior to transmission over the low-pin count communication link,
   wherein in response to detecting the second message has been enqueued in the second priority queue, the MAU is configured to flush the FIFO buffer.

21. The computing device of claim 18, wherein the processor includes a hardware-based USB policy engine or is configured to implement a USB policy engine via execution of software on the CPU, and the computing device further comprises a USB Type-C receptacle having a plurality of pins including CC1 and CC2 pins coupled to the PMIC, and a plurality of VBUS pins having a VBUS voltage used to charge the battery,
   wherein the computing device is further configured to:
   detect a USB Type-C plug coupled to a USB power source has been inserted into the USB Type-C receptacle;
   configure a CC communication channel between the USB power source and the PMIC using one of the CC1 and CC2 pins; and
   perform a USB power negotiation process under which the USB power source operates as a USB power delivery (PD) source, and the computing device operates as a USB PD sink, wherein during the power negotiation messages are communicated between the PMIC and the USB policy engine using the low-pin count communication link, and messages are communicated between the PMIC and the USB power source using the CC communication channel.

22. The computing device of claim 21, wherein the PMIC includes a USB Type-C Power Controller (TCPC) having one or more TCPC registers, and the computing device is further configured to:
   receive capability information sent from the USB power source to the PMIC;
   update a TCPC register with the capability information;
   generate a read message that is transmitted over the low-pin count communication link to enable the sink policy engine to read the TCPC, the read message having a highest-priority level and being arbitrated by the MAU;
   process information read from the TCPC register using the sink policy engine;
   generate a write message that is transmitted over the low-pin count interface to enable the sink policy engine to write to a TCPC register, the write message having a highest-priority level and being arbitrated by the MAU.

23. The computing device of claim 21, wherein the plurality of priority queues in the MAU include a highest-priority queue and the computing device is further configured to:
   receive a first message from one of the PCU, PMU, CPU, or software executing on the CPU at the MAU;
   enqueuing the first message in a priority queue in the MAU that is not a highest-priority queue;
   begin transmitting the first message over the low-pin count communication link to the PMIC;
   receive a second message from the sink policy engine having a highest-priority level at the MAU and enqueuing the second message in the highest-priority queue;
   detect the second message is enqueued in the highest-priority queue in the MAU, and in response thereto, abort transmission of the first message; and
   transmit the second message over the low-pin count communication link to the PMIC.

24. The computing device of claim 18, wherein the low-pin count communication link comprises an I2C bus, and there is a single I2C link between the processor and the PMIC.

* * * * *